Patented Jan. 24, 1939

2,144,647

UNITED STATES PATENT OFFICE 2,144,647

TREATMENT OF LEATHER

John Burchill, Henry Alfred Piggott, and George Stuart James White, Blackley, Manchester, England, assignors to Imperial Chemical Industries Limited, a corporation of Great Britain No Drawing. Application October 21, 1936, Serial No. 106,924. In Great Britain October 26, 1935

9 Claims. (Cl. 149—6)

This invention relates to the treatment of chrome tanned leather.

Chrome tanned leather when once dried is difficult or impossible to wet back satisfactorily for dyeing purposes by simple immersion in water, whether or not accompanied by mechanical assistance such as is obtained by drumming.

Various proposals have been made for overcoming this difficulty, for instance, the chrome tanned leather, previous to drying, is treated with an aqueous solution of an aromatic sulphonic acid or its salts (see British specification 317,834) or of a monoacylated or unsymmetrically diacylated diamine (see British specification 294,890), or, previous to drying, the leather is treated with a strong aqueous solution of a highly soluble inorganic salt such as magnesium chloride (see German specification 605,397) or the leather, previous to drying, is dehydrated by treatment with acetone (see United States specification 1,715,623).

However effective any one of these processes may be, they suffer from certain disadvantages. Thus when treated with an organic base or sulphonic acid as above described, the affinity of the leather for dyestuffs as compared with non-treated (undried) leather may be altered so that the leather dyer is liable to obtain on such leather with a given dyestuff results different from those to which he is accustomed; in the case of treatment with solutions of inorganic salts the salts on drying and storage may sweat out, forming undesirable incrustations and crystallizing within the pores of the leather, thus subjecting it to injurious stresses and causing shrinkage. The acetone method necessitates the use of an expensive relatively volatile organic compound and a special plant is necessary for its economical recovery.

The object of this invention is to disclose a means whereby chrome tanned leather can be improved. A further object is to disclose a means whereby chrome tanned leather can be rendered amenable, after drying, to ready wetting back. A further object is to render chrome tanned leather amenable to ready wetting back without any of the disadvantages of previously known processes. Further objects will be disclosed or apparent in the following description.

These objects are attained by treating the chrome tanned leather, previous to drying, with an aqueous solution of a substantially neutral water-soluble compound containing at least one ether group and at least one —OR group; R signifying hydrogen which may be substituted by acyl for instance, acetyl, propionyl, butyryl, stearyl, lauryl, oleyl, succinyl, benzoyl, phthalyl, naphthoyl or p-toluene sulphonyl, but in all cases only neutral esters are employed. These compounds accordingly comprise polyhydroxy compounds containing at least one ether group and polyether compounds containing wholly free hydroxyl groups or wholly acylated hydroxyl groups or both.

More specifically they comprise polyglycols, polyglycerols, (polyethenoxy)-glycerols, and their ether, ester, amine derivatives, all said derivatives being characterized by the absence of marked acidic or basic properties, and by high water solubility.

As still more specific examples of such we mention condensation products of carbohydrates, particularly the sugars, with ethylene oxide, polyethylene oxide itself (cf. British specification No. 346,550), the polyglycerols, condensation products of substances containing hydroxy or amino groups with ethylene oxide, for example, polyethenoxyurea (cf. British specification 432,356) or polyetheneoxydimethylolurea (cf. British specification No. 420,137) and also acyl derivatives of such compounds, for example, polyethenoxydimethylolurea stearate, laurate, oleate, polyglyceryl oleate, acetate, propionate, butyrate, benzoate, phthalate, succinate, naphthoate, p-toluenesulphonate, the oleate, e. g. prepared by heating oleic acid with an excess of glycerol over that required to form the monoglyceride and an alkaline catalyst such as caustic potash: (cf. German specification 575,911), stearyl-, oleyl-, acetyl-, benzoyl-, methylglucamine polyethylene glycol ether (cf. British specification 420,518), methylglucoside polyethylene glycol ether (prepared by interaction of α-methylglucoside with ethylene oxide in presence of a trace of caustic soda solution at 120–150° C.), the condensation product of monohydric alcohols such as cetyl alcohol, dodecyl alcohol, or oleyl alcohol with ethylene oxide (cf. British specification 380,431), or the condensation products of sod oil with ethylene oxide (cf. British specification 434,424).

The compounds used, as previously stated, are characterized by high water solubility and, being substantially neutral substances, possessing neither marked acidic or marked basic characteristics, are practically without effect on the affinity of the leather for dyestuffs nor do they cause any alteration of the shade normally obtained on chrome tanned leather which has been dried and wetted back.

Even when employed from concentrations of about 20%, sweating out of the product and undesirable crystallization within the fibre do not take place and, as they are readily soluble in water, the use of organic solvents is unnecessary.

The compounds are employed in aqueous solutions, preferably in concentrations of from 3%-30%, in the form of standing baths which are replenished as required or the baths may be applied with agitation in a revolving drum. By this process of treatment prior to drying we obtain a clean pale green coloured leather of smooth grain readily wettable with water. The compounds, having little or no affinity for the leather, are readily removed by washing with water.

The following examples illustrate but do not limit the invention.

Example 1

100 parts of damp full chrome tanned and neutralized calf skins from the shaving machine are drummed in a solution of 20 parts of a cane sugar-ethylene oxide condensation product prepared as described below, dissolved in 150 parts water at about 40° C. for 1 to 1½ hours. The skins are then horsed up and allowed to drain and dried at a temperature of 35°–40° C. when a clear greenish-white leather is obtained which on subsequent immersion in warm water wets readily and satisfactorily.

The above cane sugar ethylene oxide condensation product may be prepared by condensing 342 parts of sucrose mixed with three times its weight of sand, which serves to moderate the reaction, with 1320 parts of ethylene oxide in the presence of a small amount of caustic soda under the conditions described for sorbitol in French specification 650,973.

In place of the compound above mentioned its esters such as its acetate, benzoate or phthalate prepared by heating the cane sugar-ethylene oxide condensation product with the appropriate acid anhydride, may be employed.

Example 2

100 parts of damp shaved goatskins, chrome tanned and neutralized, are drummed in a solution containing 12 parts of polyethyleneglycol in 200 parts of water at 40° C. and 1½ to 2 hours. The skins are then horsed up, allowed to drain and finally air-dried. A leather inappreciably altered in colour which is easily wetted by warm water when desired is obtained. The polyethyleneglycol (polyethylene oxide; cf. Staudinger, "Die Hochmolekular Organische Verbindungen", Berlin, 1932, pp. 288–9) is prepared by interaction of 300 parts of ethylene oxide with 18 parts of ethyleneglycol in presence of a small amount of caustic soda at 100° C. in an autoclave.

In place of the above compound the water-soluble esters of polyethylene glycol (see Staudinger, loc. cit., p. 287), may be used.

Example 3

100 parts of wet chrome-tanned sheep skins, shaved and neutralized, are drummed in a solution containing 10 parts polyglycerol (prepared by heating glycerol with 1% by weight of 50% aqueous caustic potash at 280° C.) dissolved in 200 parts of water at 40° C. for 1 to 1½ hours. After horsing up the drained skins are air-dried when a leather practically unaffected in shade is obtained which may be stored in the dry state and wetted back in warm water when required for further treatment. Instead of polyglycerol, polyglyceryl esters, for example, polyglyceryl acetate, polyglyceryl oleate, polyglyceryl benzoate, polyglyceryl phthalate, polyglyceryl succinate, polyglyceryl naphthoate, polyglyceryl p-toluene sulphonate, may be employed. These are readily formed by esterifying polyglycerol prepared as above with the appropriate acid chloride or acid anhydride or, in the case of the higher fatty acids, directly from glycerol and the appropriate fatty acid as described in the German patent specification 575,911.

Example 4

100 parts of chrome-tanned hides from the shaving machine are neutralized and drummed for 2 hours at 40° C. in a solution of 15 parts of polyethenoxyurea (prepared as described in British specification 432,356, Example 2, first paragraph) dissolved in 200 parts of water. The hides are then horsed up, allowed to drain and eventually air dried. The leather so obtained is not appreciably affected in appearance and may readily be re-wetted as desired. In the above example there may be used instead of polyethenoxyurea an equal weight of polyethenoxydimethylolurea or its stearate, laurate or oleate (cf. British specification 420,137) with like result.

Example 5

100 parts of damp full chromed calf skins from the shaving machine are neutralized and drummed in a solution of 12 parts of stearylmethylglucamine polyethyleneglycol ether (cf. British specification 420,518, Example 4) in 200 parts water for 1½ hours at 40° C. Afterwards the skins are horsed up, drained and air dried. The resulting dry leather is readily wetted back when desired for further processing by immersion in warm water. Similar results may be obtained by using instead of stearylmethylglucamine polyethyleneglycol ether in the above example an equal quantity of methyl glucoside polyethyleneglycol ether, or the corresponding oleyl, benzoyl, or acetyl methyl glucamine compound.

Example 6

100 parts of neutralized damp shaved chrome-tanned goat skins are drummed in 200 parts of a 6.5% aqueous solution of the sod oil-ethylene oxide condensation product described in Example 3 of British specification 434,424. After this treatment the horsed up and drained skins are air dried.

Example 7

100 parts of wet chrome-tanned sheep skins from the shaving machine are first neutralized and then immersed in 200 parts of a 6% solution of the substance sold under the trade name of Emulphor O, which is presumed to have the constitution $C_{12}H_{25}(OC_2H_4)_n.OH$, where $n$ is greater than 10 (see Chwala, Oesterr. Chem. Ztg., 1935, No. 1, page 4) at 40°–45° C. After horsing up the drained skins are air dried. They may then be stored in the dry state and are readily re-wetted when desired.

Example 8

100 parts of chrome-tanned calf skins treated according to any of the Examples 1–7 are wetted back in the drum with 1000 parts of water at 40° C. for 30 minutes, which effects the removal of the hydroxy ether compound. The water is then run off and 400 parts of water at 50° C. substituted. To this liquor there is gradually added through the trunnion 2 parts of Chlorazol Black (Colour Index 581) previously dissolved in 50 parts of hot water. Dyeing is completed in 45 minutes, after which the skins are fat liquored and finally dried.

As many apparently widely different embodiments of this invention may be made without departing from the spirit and scope thereof, it is to be understood that we do not limit ourselves to the specific embodiments thereof except as defined in the appended claims.

We claim:

1. The process for preparing dry chrome-tanned leather having wetting back properties whereby subsequent processing in aqueous media, such as dyeing, may be readily effected, which comprises treating chrome-tanned leather while still wet from the tanning process with an aqueous solution of a substantially neutral, highly water-soluble compound containing at least one ether group and at least one —OR group wherein R signifies hydrogen or an acyl group, and then subjecting the so-treated leather to drying conditions.

2. In a process for treating chrome-tanned leather the steps comprising treating chrome-tanned leather while still wet from the tanning process with an aqueous solution of a substantially neutral highly water-soluble compound containing at least one ether group and at least one —OR group wherein R signifies hydrogen or an acyl group, subjecting the so-treated leather to drying conditions, wetting back the dried leather, and then subjecting the wetted leather to dyeing conditions in an aqueous media.

3. The process for preparing dry chrome-tanned leather having wetting back properties whereby subsequent processing in aqueous media, such as dyeing, may be readily effected which comprises treating undried chrome-tanned leather with a compound selected from the group consisting of polyhydroxy compounds containing at least one ether group, polyether compounds, and amino derivatives of polyether compounds, which compounds are characterized by high water solubility, a substantially neutral reaction, the presence of hydroxyl or acylated hydroxyl groups, the presence of ether groups, and by conferring on dry chrome-tanned leather, with which they are incorporated, the property of ready wettability and then drying the so-treated leather.

4. The process of claim 3 in which the treating compound contains a polyethenoxy group.

5. The process of claim 3 in which the treating compound is a polyethenoxy carbohydrate.

6. The process of claim 3 in which the treating compound is polyethenoxy sucrose.

7. The process of claim 3 in which the treating compound is a condensation product of ethylene oxide and dodecyl alcohol.

8. The process of claim 3 in which the treating compound contains a polyglyceryl group.

9. The process of claim 3 in which the treating compound is polyglyceryl oleate.

JOHN BURCHILL.
HENRY ALFRED PIGGOTT.
GEORGE STUART JAMES WHITE.